Dec. 31, 1929.  F. D. COPPOCK  1,742,058
DISCHARGE CONTROLLING DEVICE FOR DUMP BODIES
Filed Nov. 19, 1928  2 Sheets-Sheet 1
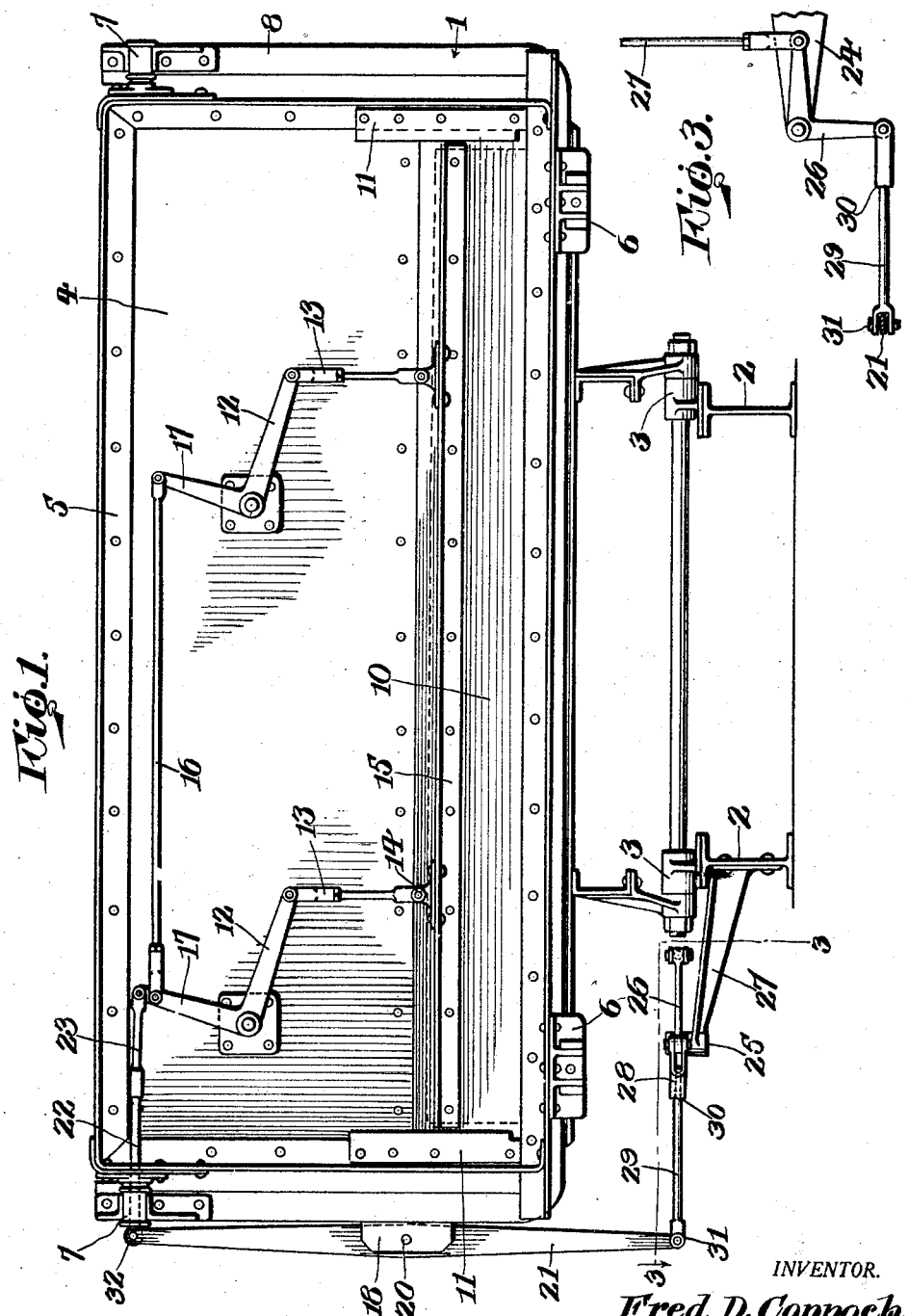
INVENTOR.
Fred D. Coppock,
BY
Geo. P. Kimmel
ATTORNEY.

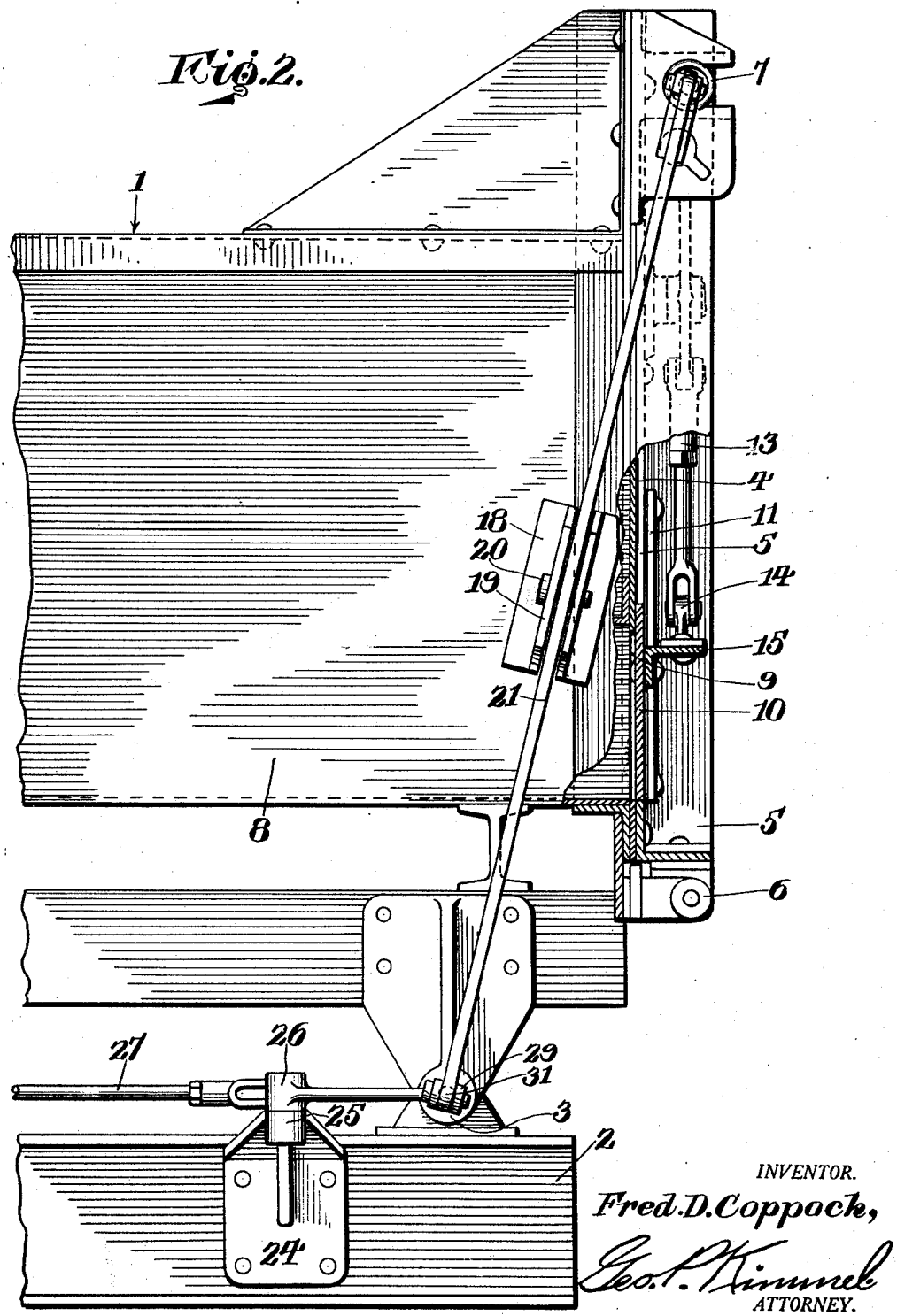

Patented Dec. 31, 1929

1,742,058

UNITED STATES PATENT OFFICE

FRED D. COPPOCK, OF GREENVILLE, OHIO

DISCHARGE-CONTROLLING DEVICE FOR DUMP BODIES

Application filed November 19, 1928. Serial No. 320,463.

This invention relates to a device for controlling the flow of material from the bed of a conventional pivoted dump body through a discharge opening in the tail gate thereof, which control mechanism is operated from the driver's seat and can be used in connection with any type of conventional dumping body in which it is desired to positively control the flow of material from the body as it is being dumped.

The primary object of the invention is to provide, in a manner as hereinafter set forth, a device adapted to be connected with a tail gate as aforesaid, by means of which the discharge opening of the tail gate may be controlled from the driver's seat of the vehicle with which the tail gate is associated.

A further object of the invention is to provide a discharge controlling device as aforesaid, which is adapted for connection with a flat bottom dump truck and which is assembled in such a manner with respect to the truck as to be unaffected by the moving elements of the truck during the dumping operation of the latter.

A further object of the invention is to provide a discharge controlling device as aforesaid, which is simple in construction, positive in operation, economical to manufacture, and which may be readily installed in connection with a conventional dump body.

With the foregoing and other objects in view the invention consists in the novel construction, combination and arrangement of parts as hereinafter more particularly described, and as illustrated in the accompanying drawings wherein is shown a preferred embodiment of the invention, but it is to be understood that such drawings and description are to be taken as illustrative rather than limitative.

In the accompanying drawings in which like numerals are employed to designate like parts throughout the same:—

Figure 1 is a rear end elevation of a dump truck showing an embodiment of my invention in association therewith.

Figure 2 is a fragmentary side elevation of the same shown partly in section.

Figure 3 is a section taken on line 3—3 of Figure 1.

Referring to the drawings in detail the numeral 1 indicates generally a truck body which is pivotally mounted adjacent its rear end on a pair of frame members 2 extending longitudinally of the truck body. The pivotal connection for the truck body is indicated at 3 and is disposed to permit the body to swing in a vertical arc.

The body 1 is provided at its rear end with a tail gate 4 which is provided with a reinforcing member 5. The reinforcing member 5 is preferably formed of angle iron and extends entirely around a marginal portion of the outer face of the tail gate 4. The tail gate 4 is secured in position by means of a pair of combined latch and pivot members indicated conventionally at 6, by means of which the tail gate is secured to the truck at the lower edge of the tail gate, and a pair of combined latch and pivot members 7 by means of which the tail gate is secured to the sides 8 of the body at the sides of the tail gate and adjacent the top thereof.

The tail gate 4 is formed with a discharge opening 9 which extends over the entire width of the body 1 and which extends upwardly for a substantial distance from the bottom of the body 1. A slide valve 10 is provided for the opening 9, which is held in position by a pair of guide members 11 which are secured to the side portions of the reinforcing member 5. The guide members 11 project inwardly from the side portions of the reinforcing member 5, and in connection with the outer face of the tail gate 4 form guide-ways within which the valve 10 is vertically slidable.

Pivotally secured to the outer face of the tail gate 4 is a pair of spaced bell cranks 12, the lower ends of which are pivotally connected to the upper ends of a pair of links 13. The lower end of the links are pivotally connected as indicated at 14, to an angle iron 15 secured to the outer face of the slide valve 10 adjacent the top of the latter. The bell cranks 12 are disposed at the same angle and the links 13 respectively are disposed an equal distance from the respective side edges of the tail gate 4. The bell cranks 12 are connected together by means of a tie rod 16, the ends respectively of which are pivotally connected to the upper arms 17 of the respective bell cranks 12.

Disposed at an inclination and secured to the outer face of one of the sides 8 of the body 1 is an elongated lug 18, which is formed with a pair of spaced guides 19 through which transversely extends a pivot pin 20. The inclination of the lug 18 is in a rearward direction from the bottom to the top thereof. Secured to the guides 19 by means of the pivot pin 20 is an actuating lever 21 which extends at the same inclination as the lug 18 and which terminates at its upper end adjacent one of the combined latch and pivot members 7. Extending through such combined latch and pivot member 7 is a connecting rod 22, the outer end of which is pivotally connected to the upper end of the actuating lever 21.

The inner end of the connecting rod 22 is swivelly connected to one end of a link 23, the other end of which is pivotally connected to the upper arm 17 of one of the bell cranks 12. The connecting rod 22 and link 23 in their assembled relation provide a jointed link connection between the upper end of the actuating lever 21 and one of the bell cranks 12.

The lower end of the actuating lever 21 projects below the body 1 and terminates in horizontal alignment with the pivotal connections 3 which connect the body 1 with the frame members 2. Secured to one of the frame members 2 and projecting laterally therefrom at a slight upward inclination is a bracket 24, which terminates at its outer end in a vertically apertured boss 25. The bracket 24 is disposed forwardly of the pivotal connection 3. Pivotally mounted on the boss 25 is a bell crank 26, one end of which is pivotally connected to a pull rod 27 which extends in a forward direction in proximity to the driver's seat, not shown, of the truck body, and the other end of which is pivotally connected to a yoke 28. Connecting the yoke 28 with the actuating lever 21 is a connecting rod 29, one end of which is swivelled into the yoke 28, as indicated at 30, and the other end of which is pivotally connected, as indicated at 31, to the lower end of the actuating lever 21.

The pivotal connection 31 and swiveled connection 30 are in horizontal alignment with the pivotal connections 3 for the body 1 and the swiveled connection 30 is provided to permit a relative movement between the connecting rod 29 and yoke 28 when the truck body 1 is swung about its pivotal connections 3. When a pull is exerted on the pull rod 27, such pull is transmitted through the bell crank 26, yoke 28 and connecting rod 29, to the actuating lever 21, causing the latter to be swung on its pivot 20 with the lower end of the lever 21 moving towards the body 1 and with the upper end of the lever 21 moving away from the body 1.

As the upper end of the actuating lever 21 is moved away from the body, a pull is exerted through the connecting rod 22 and link 23 to the bell crank 12 to which the link 23 is connected. Due to the tie rod 16 which connects the upper arms 17 of the bell cranks 12, any force exerted on one of the bell cranks causes them both to move in unison. Owing to the rigidity of all of the intermediate members connecting the valve 10 with the pull rod 27, the valve 10 may be reciprocated by a reciprocation of the pull rod 27.

The tail gate 4 may be used independently of the discharge control mechanism when it is desired to swing it in an upward direction from member 6 without disconnecting any of the control mechanism. When it is desired to swing tail gate 4 in a downward direction from member 7 the control mechanism must be disconnected by removing pivot pin 32 which connects the upper end of the actuating lever 21 with connecting rod 22.

It is thought that the many advantages of a discharge controlling device in accordance with this invention will be readily apparent, and although the preferred embodiment of the invention is as illustrated and described, yet it is to be understood that various changes may be made in the details of construction which fall within the scope of the invention as defined in the appended claims.

What I claim is:

1. In a pivoted dump body, a lever pivotally connected intermediate its ends to a side of the body, mechanism pivotally connected to one end of said lever for controlling the discharge of material from the body, means pivotally connected with the opposite end of said lever whereby the latter may be operated from the driver's seat of the body, said opposite end of the lever being disposed in horizontal alignment with the pivot for the body, said means including a rod pivotally connected to said opposite end of the lever and extending longitudinally in alignment with said opposite end and pivot for the body, and a bell crank swivelly connected with said rod.

2. In a pivoted dump body, a lever pivotally connected intermediate its ends to a side of the body, mechanism pivotally connected to one end of said lever for controlling the discharge of material from the body, means pivotally connected with the opposite end of said lever whereby the latter may be operated from the driver's seat of the body, said opposite end of the lever being disposed in horizontal alignment with the pivot for the body, said discharge controlling mechanism including, a vertically slidable tail gate valve, a pair of bell cranks each pivotally connected at one end with said valve, and means pivotally connecting the opposite ends of said bell cranks with said lever.

3. In a dump body, a lever positioned at one side of the body in proximity to the rear end of the latter, means pivotally connecting said lever intermediate its ends to said side of the body, a discharge controlling mechanism for the body, means pivotally and slidably connecting said mechanism with the body, an operative shifting connection between said mechanism and one end of said lever, and means pivotally connected with the opposite end of said lever whereby the latter may be operated from the driver's seat of the body, said lever being inclined rearwardly from bottom to top and operating on its pivot transversely of the body.

4. In a dump body, a lever positioned at one side of the body in proximity to the rear end of the latter, means pivotally connecting said lever intermediate its ends to said side of the body, a discharge controlling mechanism for the body, means pivotally and slidably connecting said mechanism with the body, an operative shifting connection between said mechanism and one end of said lever, a rod pivotally connected to the opposite end of said lever, a bell crank swivelly connected with said rod, and a pull rod pivotally connected with said bell crank and extending in proximity to the driver's seat of the body, said lever being inclined rearwardly from bottom to top and operating on its pivot transversely of the body.

5. In a pivoted truck body, an actuating lever pivoted intermediate its ends to one side of the body, said lever being of a length to depend below the bottom of the body, a vertically shiftable slide valve for controlling the discharge of material from one end of the body, guides retaining the valve in position, spaced lifting and lowering devices for the valve and each including a pivoted bell crank, said bell cranks being connected together for operating in unison, an operative shifting connection between one of the bell cranks and said actuating lever, and a lever mechanism positioned below the body and connected to the lower end of said actuating lever for shifting it, said lever mechanism including a pull rod adapted to be operated from the driver's seat of the body.

6. In a pivoted truck body, an actuating lever pivoted intermediate its ends to one side of the body, said lever being of a length to depend below the bottom of the body, a vertically shiftable slide valve for controlling the discharge of material from one end of the body, guides retaining the valve in position, spaced lifting and lowering devices for the valve and each including a pivoted bell crank, said bell cranks being connected together for operating in unison, an operative shifting connection between one of the bell cranks and said actuating lever, and a lever mechanism positioned below the body and connected to the lower end of said actuating lever for shifting it, said lever mechanism including a pull rod adapted to be operated from the driver's seat of the body, said lever mechanism being provided with a swivel joint in horizontal alignment with the pivot for the body.

7. In a pivoted truck body, an actuating lever pivoted intermediate its ends to one side of the body, said lever being of a length to depend below the bottom of the body, a vertically shiftable slide valve for controlling the discharge of material from one end of the body, guides retaining the valve in position, spaced lifting and lowering devices for the valve and each including a pivoted bell crank, said bell cranks being connected together for operating in unison, an operative shifting connection between one of the bell cranks and said actuating lever, and a lever mechanism positioned below the body and connected to the lower end of said actuating lever for shifting it, said lever mechanism including a pull rod adapted to be operated from the driver's seat of the body, said lever mechanism being provided with a swiveled joint in horizontal alignment with the pivot for the body, said actuating lever having its lower end disposed in horizontal alignment with said swiveled joint.

8. In a dump body of the type pivoted adjacent its rearward end to swing in a vertical arc, a lug projecting laterally from one side of the body, a lever pivoted intermediate its ends to said lug, said lever inclining rearwardly from bottom to top and being of a length to project below the body, a tail gate for the body provided with a discharge opening, a vertically slidable valve for controlling said opening, means operatively connecting said valve with the upper end of said lever whereby the valve is reciprocated by the oscillation of the lever on its pivot, and mechanism connected with the lower end of said lever for oscillating the latter, said mechanism including a pull rod extending in proximity to the driver's seat of the body.

9. In a dump body of the type pivoted adjacent its rearward end to swing in a vertical arc, a lug projecting laterally from one side of the body, a lever pivoted intermediate its ends to said lug, said lever inclining rearwardly from bottom to top and being of a length to project below the body, a tail gate for the body provided with a discharge opening, a vertically slidable valve for controlling said opening, means operatively connecting said valve with the upper end of said lever whereby the valve is reciprocated by the oscillation of the lever on its pivot, and mechanism connected with the lower end of said lever for oscillating the latter, said mechanism including a pull rod extending in proximity to the driver's seat of the body and further including a swiveled joint disposed in horizontal alignment with the lower end of said lever and the pivot for the body.

10. In a dump body of the type pivoted adjacent its rearward end to swing in a vertical arc, a lug projecting laterally from one side of the body, a lever pivoted intermediate its ends to said lug, said lever inclining rearwardly from bottom to top and being of a length to project below the body, a tail gate for the body provided with a discharge opening, a vertically slidable valve for controlling said opening, means operatively connecting said valve with the upper end of said lever whereby the valve is reciprocated by the oscillation of the lever on its pivot, and mechanism connected with the lower end of said lever for oscillating the latter, said mechanism including a pull rod extending in proximity to the driver's seat of the body, the oscillatory movement of said lever being towards and from the body.

11. In a dump body of the type pivoted adjacent its rearward end to swing in a vertical arc, a lug projecting laterally from one side of the body, a lever pivoted intermediate its ends to said lug, said lever inclining rearwardly from bottom to top and being of a length to project below the body, a tail gate for the body provided with a discharge opening, a vertically slidable valve for controlling said opening, means operatively connecting said valve with the upper end of said lever whereby the valve is reciprocated by the oscillation of the lever on its pivot, and mechanism connected with the lower end of said lever for oscillating the latter, said mechanism including a pull rod extending in proximity to the driver's seat of the body, said means including a pair of bell cranks pivoted to said tail gate, and a pair of links pivotally connecting said bell cranks to said valve.

12. In a dump body of the type pivoted adjacent its rearward end to swing in a vertical arc, a lug projecting laterally from one side of the body, a lever pivoted intermediate its ends to said lug, said lever inclining rearwardly from bottom to top and being of a length to project below the body, a tail gate for the body provided with a discharge opening, a vertically slidable valve for controlling said opening, means operatively connecting said valve with the upper end of said lever whereby the valve is reciprocated by the oscillation of the lever on its pivot, mechanism connected with the lower end of said lever for oscillating the latter, said mechanism including a pull rod extending in proximity to the driver's seat of the body, said means including a pair of bell cranks pivoted to said tail gate, a pair of links pivotally connecting said bell cranks to said valve, a jointed link connecting one of said bell cranks with the upper end of said lever, and a tie rod connecting the bell cranks for operating the latter in unison.

13. In an attachment for a pivoted dump body, a lever adapted to be pivotally connected intermediate its ends to a side of the body, mechanism pivotally connected to one end of the lever for controlling the discharge of material from the body, means pivotally connected with the opposite end of the lever whereby the latter may be operated from the driver's seat of the body, said opposite end of the lever being adapted to be disposed in horizontal alignment with the pivot for the body, said means including a rod pivotally connected to said opposite end of the lever and adapted to extend transversely of the body in horizontal alignment with said opposite end and the pivot for the body, and also including a bell crank swivelly connected with said rod.

14. In an attachment for a pivoted dump body, a lever adapted to be pivotally connected intermediate its ends to a side of the body, mechanism pivotally connected to one end of the lever for controlling the discharge of material from the body, means pivotally connected with the opposite end of the lever whereby the latter may be operated from the driver's seat of the body, said opposite end of the lever being adapted to be disposed in horizontal alignment with the pivot for the body, said means including a rod pivotally connected to said opposite end of the lever and adapted to extend transversely of the body in horizontal alignment with said opposite end and the pivot for the body, said discharge controlling mechanism including a vertically slidable tail gate valve and further including a pair of bell cranks, each pivotally connected at one end with said valve, and means pivotally connecting the opposite ends of said bell cranks with said lever.

15. In an attachment for a pivoted truck body, an actuating lever adapted to be pivotally connected intermediate its ends to one side of the body, a vertically shiftable slide valve for controlling the discharge of material from one end of the body, spaced lifting and lowering devices for the valve and each including a pivoted bell crank, said bell cranks being connected together for operating in unison, an operative shifting connection between one of the bell cranks and said actuating lever, and a lever mechanism connected to the lower end of said actuating lever for shifting it and including a pull rod adapted to be operated from the driver's seat of the body.

16. In an attachment for a pivoted truck body, an actuating lever adapted to be pivotally connected intermediate its ends to one side of the body, a vertically shiftable slide valve for controlling the discharge of material from one end of the body, spaced lifting and lowering devices for the valve and each including a pivoted bell crank, said bell cranks being connected together for operating in unison, an operative shifting connection between one of the bell cranks and said actuating lever, and a lever mechanism connected to the lower end of said actuating lever for shifting it and including a pull rod adapted to be operated from the driver's seat of the body, said lever mechanism being provided with a swivelled joint adapted to be positioned in horizontal alignment with the pivot for the body.

17. In an attachment for a dump body of that type having a vertically shiftable tail gate, a lever adapted to be pivotally connected intermediate its ends to one side of the body, a rod pivotally connected to the upper end of said lever, spaced lifting and lowering devices for the tail gate, a tie rod pivotally connected with each of said lifting and lowering devices, one of said lifting and lowering devices being pivotally connected to said rod, a rod pivotally connected to the lower end of said lever, a bell crank swivelly connected to said last named rod, and a pull rod pivotally connected to said bell crank.

In testimony whereof, I affix my signature hereto.

FRED D. COPPOCK.